US012807743B2

(12) United States Patent
Chuencheep et al.

(10) Patent No.: US 12,807,743 B2
(45) Date of Patent: Nov. 24, 2026

(54) MOLECULAR WEIGHT DISTRIBUTION ADJUSTMENT OF POLYETHYLENE BY EXTERNAL ELECTRON DONOR

(71) Applicant: PTT GLOBAL CHEMICAL PUBLIC COMPANY LIMITED, Chatuchak (TH)

(72) Inventors: Worawat Chuencheep, Chatuchak (TH); Nitipat Phichitsurathaworn, Chatuchak (TH)

(73) Assignee: PTT Global Chemical Public Company Limited, Chatuchak (TH)

( * ) Notice: Subject to any disclaimer, the term of this patent is extended or adjusted under 35 U.S.C. 154(b) by 792 days.

(21) Appl. No.: 18/267,380

(22) PCT Filed: Dec. 15, 2021

(86) PCT No.: PCT/IB2021/061731
§ 371 (c)(1),
(2) Date: Jun. 14, 2023

(87) PCT Pub. No.: WO2022/130220
PCT Pub. Date: Jun. 23, 2022

(65) Prior Publication Data

US 2024/0059812 A1 Feb. 22, 2024

(30) Foreign Application Priority Data

Dec. 15, 2020 (TH) ................................ 2001007091

(51) Int. Cl.

| | |
|---|---|
| ***C08F 110/02*** | (2006.01) |
| ***C08F 4/642*** | (2006.01) |
| ***C08F 4/646*** | (2006.01) |
| ***C08L 23/0807*** | (2025.01) |

(52) U.S. Cl.
CPC .......... *C08F 110/02* (2013.01); *C08F 4/6421* (2013.01); *C08F 4/6465* (2013.01); *C08L 23/0815* (2013.01); *C08L 2314/02* (2013.01)

(58) Field of Classification Search
None
See application file for complete search history.

(56) References Cited

U.S. PATENT DOCUMENTS

| | | | | |
|---|---|---|---|---|
| 7,531,607 | B2 | 5/2009 | Vestberg | |
| 8,026,311 | B2 | 9/2011 | Migone et al. | |
| 2004/0014916 | A1 * | 1/2004 | Shamshoum ........... | C08F 10/00 526/158 |
| 2006/0252894 | A1 * | 11/2006 | Thorman ................ | C08F 10/00 526/128 |
| 2017/0247483 | A1 | 8/2017 | Tupe et al. | |
| 2017/0306061 | A1 | 10/2017 | Gupta et al. | |
| 2018/0251582 | A1 | 9/2018 | Banat et al. | |
| 2019/0292284 | A1 * | 9/2019 | Sumerin ................. | C08L 23/16 |

FOREIGN PATENT DOCUMENTS

| | | |
|---|---|---|
| CN | 106496802 A | 3/2017 |
| WO | 2019094216 A1 | 5/2019 |

OTHER PUBLICATIONS

International Search Report and Written Opinion issued in PCT/IB2021/061731 dated Mar. 1, 2022.

* cited by examiner

*Primary Examiner* — Christopher M Rodd
(74) *Attorney, Agent, or Firm* — Troutman Pepper Locke LLP

(57) ABSTRACT

The present invention relates to a process to control the molecular weight distribution of polyethylene and to reduce the smoke quantity during the formation of polyethylene, wherein the process for preparing polyethylene having narrow molecular weight distribution, comprising the following steps:

a) continuously polymerizing ethylene by subjecting ethylene stream, hydrogen, solvent, Ziegler-Natta catalyst comprising titanium, co-catalyst, external electron donor selected from alkoxysilane compound into the reactor to produce polymer slurry;
b) removing residue reaction gas from the polymer slurry stream obtained from a) and
c) separating polymer stream in b) from the solvent.

14 Claims, No Drawings

MOLECULAR WEIGHT DISTRIBUTION ADJUSTMENT OF POLYETHYLENE BY EXTERNAL ELECTRON DONOR

This application is a U.S. national stage application of International Application No. PCT/IB2021/061731, filed on Dec. 15, 2021, which claims priority to Thai patent Application No. 2001007091, filed Dec. 15, 2020, the entire contents of which are hereby incorporated by reference in their entireties.

TECHNICAL FIELD

The present invention relates to the field of chemistry, in particular, to the molecular weight distribution adjustment of polyethylene by external electron donor.

BACKGROUND ART

Polyethylene is the plastic that has been widely used because its low price provided the lower production cost comparing to other plastics. Generally, polyethylene can be prepared from polymerization of ethylene in suspended phase in the solvent. As a consequence, the polyethylene prepared by said method cannot be able to be formed by drawing machine at the speed higher than 250 m/min, resulting that the delay in the industrial production process.

Moreover, another problem mostly found in the production process is the smoke occurred during the forming process of polyethylene fiber, which required heat for melting the polymer. The polymer is melted and drawn at the same time, causing smoke during the production process. The initial analysis found that said smoke is hydrocarbons having molecular weight less than 500 g/mole.

CN106496802A discloses the preparation of ethylene-propylene copolymer for composite fiber having a narrow molecular weight distribution and reduces the chance of causing smoke in the forming process by controlling the polymerization within the temperature of 83-85° C. and the polymerization pressure from 0.3-0.6 MPa.

EP172094294 discloses the polymerization process of polypropylene comprising propylene, hydrogen catalyst, and external electron donor selected from amino-silane for the synthesis of polypropylene in the first polymerization medium under solution condition or slurry condition at the lower bubble point or lower. The removal of hydrogen from the first polymerization medium and the preparation of the step for separate olefin/polyolefin were done before entering the second polymerization medium in the gas phase reactor. Then, the obtained product was reacted with ethylene to obtain ethylene-propylene copolymer having melt flow rate at least 60 g/10 min. The obtained polymer can be applied in the automobile parts.

U.S. Pat. No. 8,026,311B2 discloses the polymerization process of propylene and ethylene or other α-olefins by addition of cyclohexylmethyl dimethoxysilane and diethylamino triethoxysilane as the external electron donor in polymerization step. This obtained ethylene-propylene copolymers having higher molecular weight.

U.S. Pat. No. 7,531,607B2 discloses the preparation of at least two different grades of polypropylene. In this process, the isotacticity polypropylene has been changed, whereas the flow rate of the polymer was kept at the predetermined level. The transformation of the first grade polymer into the second grade comprised at least one polymerization reactor. Propylene polymer can be reacted with co-monomer under polymerization condition using Ziegler-Natta catalytic system together with silane group as an external electron donor.

Although, Ziegler-Natta catalyst have been applied with the external electron donor in the polymerization of polypropylene, said process is not widely known for the preparation of polyethylene, especially the application of the external electron donor together with the use of the catalyst for controlling the molecular weight distribution.

From all above, this invention aims to discover the method for controlling the molecular weight distribution of polyethylene including the reduction of smoke occurred during the formation of polyethylene using Ziegler-Natta catalyst together with silane compound as the external electron donor in the polymerization process of ethylene. Therefore, the polyethylene prepared by the method according to the present invention has narrow molecular weight distribution and lower smoke occurred in the production process.

SUMMARY OF INVENTION

The present invention related to the control the molecular weight distribution of polyethylene and to reduce the smoke occurred during the production process of polyethylene, wherein the process for preparing polyethylene having narrow molecular weight distribution, comprising the following steps:

a) continuously polymerizing ethylene by subjecting ethylene stream, hydrogen, solvent, Ziegler-Natta catalyst comprising titanium, co-catalyst, external electron donor selected from alkoxysilane compound into the reactor to produce polymer slurry;
b) removing residue reaction gas from the polymer slurry stream obtained from a); and
c) separating polymer stream in b) from the solvent.

DESCRIPTION OF THE INVENTION

The present invention discloses the method for controlling the molecular weight distribution of polyethylene by the use of Ziegler-Natta catalyst together with silane compound as the external electron donor.

Any aspect being shown here means to include its application to other aspects of this invention unless stated otherwise.

Technical terms or scientific terms used here have definitions as by a person skilled in the art unless stated otherwise.

Any tools, equipment, methods, or chemicals named herein mean tools, equipment, methods, or chemicals being used commonly by a person skilled in the art unless stated otherwise that they are tools, equipment, methods, or chemicals specific only in this invention.

Use of singular noun or singular pronoun with “comprising” in claims or specification means “one” and including “one or more”, “at least one”, and “one or more than one”.

All compositions and/or methods disclosed and claims in this application aim to cover embodiments from any action, performance, modification, or adjustment without any experiment that significantly different from this invention, and obtain with object with utility and resulted as same as the present embodiment according to a person ordinary skilled in the art although without specifically stated in claims. Therefore, substitutable or similar object to the present embodiment, including any little modification or adjustment that clearly seen by a person skilled in the art should be construed as remains in spirit, scope, and concept of invention as appeared in appended claims.

Throughout this application, term “about” means any number that appeared or showed here that could be varied or deviated from any error of equipment, method, or personal using said equipment or method.

Hereafter, invention embodiments are shown without any purpose to limit any scope of the invention.

The process for preparing polyethylene having narrow molecular weight distribution according to the invention comprising the following steps:

a) continuously polymerizing ethylene by subjecting ethylene stream, hydrogen, solvent, Ziegler-Natta catalyst comprising titanium, co-catalyst, external electron donor selected from alkoxysilane compound into the reactor to produce polymer slurry;
b) removing residue reaction gas from the polymer slurry stream obtained from a) and
c) separating polymer stream in b) from the solvent.

In one aspect of the invention, the Ziegler-Natta catalyst comprises at least one titanium compound.

In another aspect of the invention, the Ziegler-Natta catalyst is magnesium chloride supported titanium tetrachloride catalyst.

In one aspect of the invention, the process according to the invention comprises the polymerization under condition with organic solvent selected from, but not limited to, propane, butane, isobutane, pentane, hexane, heptane, octane, benzene, and toluene, preferably hexane.

In one aspect of the invention, the external electron donor comprises at least one silane compound.

In one aspect of the invention, the external electron donor is selected from alkoxysilane as shown in structure (I):

$$R'_nR''_mSi(OR''')_{4-n-m} \quad (I);$$

wherein, R', R'' and R''' represent a substitution group independently selected from alkyl group having 1-10 carbon atoms, or cyclic group, or aromatic group, when n and m are integer of 0-4, and n+m<4.

In one aspect of the invention, the external electron donor is selected from the group comprising tetraethoxysilane, dimethoxy diphenylsilane, dicyclopentyl dimethoxysilane, isobutylisopropyl dimethoxysilane, trimethoxy propylsilane, isobutyldimethoxy methylsilane, and trimethoxy-2-methyl propylsilane, or mixture thereof.

In one aspect of the invention, the external electron donor is dicyclopentyl dimethoxysilane.

In one aspect of the invention, the mole ratio of silicon in alkoxysilane to titanium in the Ziegler-Natta catalyst is in a range of 0.1-20.

In one aspect of the invention, the mole ratio of silicon in alkoxysilane to titanium in the Ziegler-Natta catalyst is in the range of 0.25-1.

In one aspect of the invention, the process according to the present invention further comprises alkyl aluminum compound as a co-catalyst. Preferably, the co-catalyst is triethylaluminum.

In one aspect of the invention, the concentration of the catalyst is in a range of 0.005-0.1 mmole/L. Preferably, the concentration of the catalyst is in the range of 0.03-0.05 mmole/L.

In one aspect of the invention, the concentration of the co-catalyst is in a range of 0.1-2 mmole/L. Preferably, the concentration of the co-catalyst is in the range of 0.2-1 mmole/L.

In one aspect of the invention, the polymerization of ethylene in step a) is operated at the temperature in a range of 60-90° C. and the pressure in a range of 1-8 bars.

In one aspect of the invention, the process further comprises the addition of α-olefin having 3-10 carbon atoms into the reactor in step (a), and the concentration of α-olefin is in the range of 0.1-10% by weight of polyethylene.

In one aspect of the invention, the molecular weight of polyethylene prepared from the process according to the invention is in the range of 40,000-300,000 g/mole, and the molecular weight distribution (Mw/Mn) is in the range of 4-8.

In one aspect of the invention, the density of polyethylene prepared from the process according to the invention is in the range of 0.940-0.965 g/cm$^3$, and the melt flow rate (2.16 kg/190° C.) is in the range of 0.1-30 g/10 min.

In one aspect of the invention, the polymerization of ethylene further comprises the addition of the additive selected from processing aid, mold release, antioxidant, light stabilizer, heat stabilizer, or mixture thereof into the polymer mixture.

In one aspect of the invention, the polyethylene prepared from the process according to the invention can be formed into product by injection molding process, extrusion blow molding, and rotational molding process.

In one aspect of the invention, the polyethylene can be applied to be formed into product or article, including but not limited to rope, fiber, or nonwoven.

The following examples are for demonstrating one aspect of this invention only, not for limiting the scope of this invention in any way.

Testing for Selecting Suitable External Electron Donor

Preparation of Comparative Sample

Hexane (1,000-3,000 mL) was added into the reactor. Triethylaluminum was added with controlled concentration in a range of 0.2-1.0 mmole/L. The PZ type Ziegler-Natta catalyst (produced by Mitsui Chemicals Inc.) was added with controlled concentration in a range of 0.01-0.05 mmole/L. Then, hydrogen gas and ethylene gas were fed into the reactor. The temperature and pressure of the reaction were controlled from 60-90° C. and 1.0-8.0 bars, respectively, which the reaction time 2-3 hours. Then, the temperature was reduced to the room temperature. The prepared polymer was subjected to drying process and extruded into pellet.

Preparation of the Sample According to the Invention 1-12

The samples were prepared with the same method as being described in the comparative sample by adding the silane compound as external electron donor as shown in table 1.

TABLE 1

Testing of external electron donor from comparative sample and sample according to the invention

| Sample | Type of external electron donor | Catalyst concentration (mmole/L) | Molecular weight distribution | Smoke quantity* |
|---|---|---|---|---|
| Comparative sample | — | 0.030 | 8.68 | 10790.00 |
| Sample according to the invention 1 | Dimethoxydiphenylsilane | 0.030 | 6.18 | 10201.93 |
| Sample according to the invention 2 | Dicyclopentyldimethoxysilane | 0.040 | 6.24 | 10529.80 |
| Sample according to the invention 3 | Cyclohexyldimethoxymethylsilane | 0.022 | 7.63 | 12079.37 |
| Sample according to the invention 4 | Diisobutyldimethoxysilane | 0.045 | 7.50 | 12333.50 |
| Sample according to the invention 5 | Diisopropyldimethoxysilane | 0.048 | 6.12 | 12681.53 |
| Sample according to the invention 6 | Isobutylisopropyldimethoxysilane | 0.056 | 6.24 | 8842.15 |
| Sample according to the invention 7 | Trimethoxypropylsilane | 0.040 | 7.38 | 10138.93 |
| Sample according to the invention 8 | Isobutyldimethoxymethylsilane | 0.030 | 6.64 | 9174.67 |
| Sample according to the invention 9 | Tetraethoxysilane | 0.030 | 7.08 | 9985.65 |
| Sample according to the invention 10 | Isobutyltriethoxysilane | 0.048 | 6.01 | 11839.23 |
| Sample according to the invention 11 | Triethoxypropylsilane | 0.016 | 7.09 | 13209.40 |
| Sample according to the invention 12 | Trimethoxy-2-methylpropylsilane | 0.040 | 7.26 | 10556.47 |

*Area under curve analyzed by Gas chromatography-flame Ionization Detector (GC-FID)

Testing of Molecular Weight Distribution

The molecular weight distribution was analyzed by Gel permeation chromatography (GPC-IR) with triple detector (Polymer Char) according to the following steps:

Polymer (4.0-8.0 mg) was added into vial. Then, 8.0 mL of 1,2,4-trichloribenzene was added. Sample was injected into high pressure liquid chromatography and heated at 150-160° C.

Testing of Smoke Quantity

The smoke quantity was tested by extracting the low molecular weight polyethylene from the sample by soxhlet extraction with hexane (soxhlet extractor BUCHI B-S11). Then, the low molecular weight polyethylene was analyzed by Gas chromatography (Intuvo 9000 GC system, Agilent Technologies) according to the following steps.

About 10 g of polymer was added into thimble, and hexane was added into soxhlet for extraction. The extract was filtered and was analyzed by chromatography equipped with DB-5 MS UI column (30 m×0.32 mm×0.25 microns) at flow rate 6.0 mL/s and temperature at 300° C. The area under curve was collected for the quantification of smoke quantity.

From table 1, it was found that silane compound could reduce the molecular weight distribution. Moreover, the use of dimethoxy diphenylsilane, dicyclopentyl dimethoxysilane, isobutylisopropyl dimethoxysilane, trimethoxypropyl silane, isobutyldimethoxymethyl silane, tetraethoxysilane, and trimethoxy-2-methylpropylsilane can reduce the smoke quantity occurred in the process.

Testing of Suitable External Electron Donor Quantity

Preparation of Sample According to the Invention 13-16

Samples were prepared with the same method as the sample according to the invention 2, and dicyclopentyl dimethoxysilane was added to the sample as the concentrations shown in table 2.

TABLE 2

Testing of quantity of the external electron donor according to comparative sample and sample according to the invention

| Sample | Ratio of external electron donor to catalyst (mole/mole) | Catalyst concentration (mmole/L) | Molecular weight distribution |
|---|---|---|---|
| Sample according to the invention 13 | 0.125 | 0.030 | 6.65 |
| Sample according to the invention 14 | 0.250 | 0.030 | 5.84 |

TABLE 2-continued

Testing of quantity of the external electron donor according to comparative sample and sample according to the invention

| Sample | Ratio of external electron donor to catalyst (mole/mole) | Catalyst concentration (mmole/L) | Molecular weight distribution |
|---|---|---|---|
| Sample according to the invention 15 | 0.500 | 0.035 | 5.64 |
| Sample according to the invention 16 | 0.750 | 0.050 | 5.50 |

*Area under curve analyzed by Gas chromatography-flame Ionization Detector (GC-FID)

From table 2, it was found that the molecular weight distribution was narrower when the quantity of external electron donor was higher. The catalyst concentration is preferable in the range of 0.005-0.1 mmole/L, preferably 0.03-0.05 mmole/L. The amount of silicon in silane compound in molar ratio of titanium in Ziegler-Natta catalyst (Si/Ti ration) is in the range of 0.1-20.0 mole/mole, preferably 0.25-1.0 mole/mole.

From all above, the use of silane compound as an external electron donor benefits to narrow the molecular weight distribution of the polyethylene. Consequently, the polyethylene prepared by the process according to the present invention can be drawn at higher speed. Moreover, the smoke quantity occurred during the process can be reduced. Thus, the polymer according to the invention is suitable for using to the preparation of fiber in industrial scale.

PREFERRED EMBODIMENT OF THE INVENTION

Preferred embodiment of the invention is as provided in the description of the invention.

The invention claimed is:

1. A process for preparing polyethylene having a narrow molecular weight distribution, comprising the following steps:

a) continuously polymerizing ethylene by subjecting an ethylene stream, hydrogen, a solvent, a Ziegler-Natta catalyst comprising titanium, a co-catalyst, and an external electron donor selected from an alkoxysilane compound into a reactor to produce a polymer slurry;

b) removing a residue reaction gas from the polymer slurry stream obtained from a); and c) separating the polymer stream in b) from the solvent, wherein the external electron donor is selected from the group comprising tetraethoxysilane, dimethoxy diphenylsilane, dicyclopentyl dimethoxysilane, isobutylisopropyl dimethoxysilane, trimethoxy propylsilane, isobutyldimethoxy methylsilane, and trimethoxy-2-methyl propylsilane, or a mixture thereof, and wherein the mole ratio of silicon in alkoxysilane to titanium in the Ziegler-Natta catalyst is in the range of 0.25-1.

2. The process according to claim 1, wherein the external electron donor is selected from alkoxysilane as shown in structure (I):

$$R'_nR''_mSi(OR''')_{4-n-m} \quad (I)$$

wherein, R', R'' and R''' represent a substitution group independently selected from an alkyl group having 1-10 carbon atoms, a cyclic group, or an aromatic group, when n and m are an integer of 0-4, and n+m<4.

3. The process according to claim 1, wherein the external electron donor is dicyclopentyl dimethoxysilane.

4. The process according to claim 1, wherein the co-catalyst is an alkyl aluminum compound.

5. The process according to claim 4, wherein the co-catalyst is triethylaluminum.

6. The process according to claim 1, wherein the concentration of the catalyst is in a range of 0.005-0.1 mmol/L.

7. The process according to claim 6, wherein the concentration of the catalyst is in the range of 0.03-0.05 mmol/L.

8. The process according to claim 1, wherein the concentration of the co-catalyst is in a range of 0.1-2 mmol/L.

9. The process according to claim 1, wherein the concentration of the co-catalyst is in the range of 0.2-1 mmol/L.

10. The process according to claim 1, wherein the polymerization of ethylene in step a) is operated at a temperature in a range of 60-90° C. and a pressure in a range of 1-8 bars.

11. The process according to claim 1, further comprising adding an α-olefin having 3-10 carbon atoms into the reactor in step (a).

12. The process according to claim 11, wherein the concentration of the α-olefin is in a range of 0.1-10% by weight of polyethylene.

13. The process according to claim 1, wherein the molecular weight of polyethylene is in a range of 40,000-300,000 g/mole, and the molecular weight distribution (Mw/Mn) is in a range of 4-8.

14. The process according to claim 1, wherein the density of polyethylene is in a range of 0.940-0.965 g/cm$^3$, and the melt flow rate (2.16 kg/190° C.) is in a range of 0.1-30 g/10 min.

* * * * *